United States Patent
Grzybowski et al.

(10) Patent No.: US 8,291,729 B2
(45) Date of Patent: Oct. 23, 2012

(54) MICROALIGNMENT USING LASER-SOFTENED GLASS BUMPS

(75) Inventors: Richard R Grzybowski, Corning, NY (US); Alexander Mikhailovich Streltsov, Corning, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 138 days.

(21) Appl. No.: 12/669,365

(22) PCT Filed: Jul. 15, 2008

(86) PCT No.: PCT/US2008/008609
§ 371 (c)(1),
(2), (4) Date: Jan. 15, 2010

(87) PCT Pub. No.: WO2009/011834
PCT Pub. Date: Jan. 22, 2009

(65) Prior Publication Data
US 2010/0206006 A1      Aug. 19, 2010

Related U.S. Application Data

(60) Provisional application No. 60/959,640, filed on Jul. 16, 2007, provisional application No. 61/005,055, filed on Nov. 30, 2007.

(51) Int. Cl.
C03B 23/00      (2006.01)
C03B 23/20      (2006.01)
C03B 23/203    (2006.01)

(52) U.S. Cl. .................. 65/33.5; 65/36; 65/102; 65/63; 65/64

(58) Field of Classification Search .................. 65/102, 65/275
See application file for complete search history.

(56) References Cited

U.S. PATENT DOCUMENTS

| | | | | |
|---|---|---|---|---|
| 5,910,705 | A * | 6/1999 | Cathey et al. | 313/496 |
| 6,391,213 | B1 | 5/2002 | Homola | 216/22 |
| 2005/0116245 | A1 * | 6/2005 | Aitken et al. | 257/99 |
| 2005/0217320 | A1 * | 10/2005 | Eberhardt et al. | 65/43 |
| 2006/0196600 | A1 * | 9/2006 | Nam et al. | 156/272.8 |
| 2007/0201797 | A1 * | 8/2007 | Grzybowski et al. | 385/52 |

FOREIGN PATENT DOCUMENTS

| | | | |
|---|---|---|---|
| EP | 1271224 A1 * | 1/2003 | |
| JP | 02139944 A * | 5/1990 | |
| JP | 10214859 A | 8/1998 | |
| TW | 200631151 | 9/2006 | |

OTHER PUBLICATIONS

Hulsenberg et al., "Microstructuring of Glasses", Chp. 10, pp. 263-278, 2008.*
Translated abstract of TW200631151.
Taiwan Patent Application No. 097126875 Search Report.

* cited by examiner

*Primary Examiner* — Matthew Daniels
*Assistant Examiner* — Lisa Herring
(74) *Attorney, Agent, or Firm* — Michael W. Russell

(57) ABSTRACT

Disclosed is a method for fabricating glass bump standoff structures of precise height, the method comprising providing oversized glass bumps on a glass substrate, providing a heat source to heat the bumps, positioning a substrate to be aligned on the oversized bumps, and reducing the height of the oversized bumps by a combination of manipulations comprising (1) softening the bumps by heating the bumps and (2) applying pressure to the substrate to be aligned.

7 Claims, 3 Drawing Sheets

US 8,291,729 B2

MICROALIGNMENT USING LASER-SOFTENED GLASS BUMPS

CROSS REFERENCE TO RELATED APPLICATIONS

This application is related to and claims priority to and commonly assigned U.S. Patent Application Ser. Nos. 60/959,640, filed Jul. 16, 2007, and 61/005,055, filed Nov. 30, 2007, for MICROALIGNMENT USING LASER SOFTENED GLASS BUMPS.

FIELD

This Invention relates in general to microalignment of two or more bodies, and in particular to microalignment of planar substrates using time-of-assembly electro-thermal actuation.

BACKGROUND

Planar waveguide device alignment is typically provided by an external precision positioning system such as multi-axis translation/rotation stages driven by piezo-electric micropositioners, for example. An attachment material such as an organic adhesive or metallic solder is generally positioned between aligned substrates and used to maintain long-term substrate alignment. While precision positioning systems can generally align waveguide arrays on two planar waveguide devices to within less than 0.2 µm lateral misalignment, a critical issue is maintaining waveguide alignment during adhesive curing without high rates of post-attachment rework.

In laser welding applications, post-weld bending rework is often required to achieve sub-micron lateral alignment of single waveguides. Using this method to align arrays of planar waveguides is more difficult when the bending rotation occurs in the plane parallel to the planar substrate: the rotation introduces a gap at one end of the waveguide array, introducing unwanted axial misalignments and coupling losses.

Crystal block attachment, such as disclosed in U.S. Pat. No. 6,512,642 "Method and structure for aligning optical elements", assigned to the owner of the present application, is one solution for zero-shift attachment of devices to substrates, but the cantilever nature of the planar device attachment to the common alignment substrate via an intermediate block makes the approach less suitable for planar devices requiring wirebonded electrical interconnections. Additionally, a full six-axis positioning system is required to align the two substrates.

An alternative planar device alignment and attachment approach involves microactuators that are integrated into or mounted on the common alignment substrate. For example, integrated micro actuators have been previously described that are based on expansion and/or contraction of piezoelectric materials, electro-strictive materials, magneto-strictive materials and magnetic materials. Microactuators have also been fabricated based on electrostatic forces between plates and substrates, electrically-induced shape changes in polymers and ultrasonic excitation of flexure elements. Another common integrated microactuator approach takes advantage of material expansion and/or contraction via the thermo-mechanical effect. These microactuator structures, which are often integrated into planar substrates using MEMS and semiconductor fabrication processes, can be broadly categorized into two groups: (1) Microactuators based on heating of selected supporting arms or beams, where the arms or beams are fabricated using a single material. Since remaining arms, beams or supporting structures are unheated, CTE-induced differential forces on the arms or beams lead to deformation (translation and/or rotation) of the microactuator structure; (2) Microactuators that deform because supporting arms are bi-material laminates fabricated from materials with two different CTEs. When these arms are heated, they provide actuation by curving toward the lower-CTE material.

A disadvantage with all of these actuation approaches is that they require continuous control input (e.g., an electrical signal) in order to maintain their position. This is a significant disadvantage in microalignment of hybrid optical components, since it means this control input must be maintained over the life of the product. Further, many of the microalignment technologies described above require complex precision microstructures (MEMS, for example) that increase product cost. MEMS actuators can be designed with integrated latch structures so that their position is maintained after the control input is removed. Yet these actuators can be expected to be even more complex in design than standard MEMS mentioned, resulting in even higher product cost.

Another type of thermo-mechanical actuator can be formed by heating a polymer material in an enclosed cavity so that when it expands a force is exerted in a predefined direction. This actuator solution is relatively simple compared to MEMS actuator approaches, but constant application of control input (e.g., electric potential for a polymer heater) is still required. Also, since actuation is provided by thermo-mechanical polymer expansion, changes in ambient temperature could induce changes in polymer size, resulting in unwanted shifts in actuator position.

A family of IR-absorbing Pyrex™-like glasses was recently developed at Corning. This process enables dark glass bump formation for bump heights of up to 70-100 µm. These bumps can be used as standoff structures for alignment of planar waveguide device substrate. One or more laser heating cycles direct energy to the bump to increase its height. Using a closed-loop control system, the bump height can be slowly increased until a target height is reached.

SUMMARY

An embodiment of this Invention includes a technique for fabricating glass bump standoff structures of precise height by (1) forming oversized glass bumps and (2) slowly reducing the height of these bumps via the combination of controlled bump softening and downward pressure applied on a cover substrate. Lasers are used preferentially to soften the bumps, but other energy sources may be used. The laser wavelength selected for bump softening preferably allows the beam to pass through the cover substrate with minimal optical absorption. For example, light from a 1.55 µm laser will pass through a Si substrate with minimal absorption but experiences relatively strong absorption and local heating in absorptive glasses, such as, for example, Fe and Cu-doped glasses (hereinafter "dark" glass).

According to various embodiments of the methods and techniques of the present invention: oversized dark glass bumps can be formed in-situ using laser formation or prior to dark glass substrate mounting via a variety of low-cost processes (e.g., embossing, molding); improved process control can be achieved for accurate cover substrate height positioning by use of multiple process parameters (variable laser power and cover substrate applied pressure, for example); the cover substrate height may be able to be re-positioned, after initial alignment, by repeating the bump laser heating and substrate alignment operations; cover substrate thermally insulating coating layers or surface structures can function to limit thermal dissipation through the cover substrate during bump softening; the bump softening process creates support structures with enlarged contact areas that provide improved mechanical support for the cover substrate, especially if the initial bump formation process results in bump weakening via microcracking; the same IR laser used in bump softening can also be used to locally cure adhesives placed between the cover substrate and the dark glass substrate. Other features and advantages will be apparent from the remainder of the description and the related drawings.

BRIEF DESCRIPTION OF THE DRAWINGS

FIG. 4 is a diagrammatic cross section of the hybrid assembly of FIG. 3 showing softening and resulting reduction in height of bump 28a.

DETAILED DESCRIPTION

Figure 1:
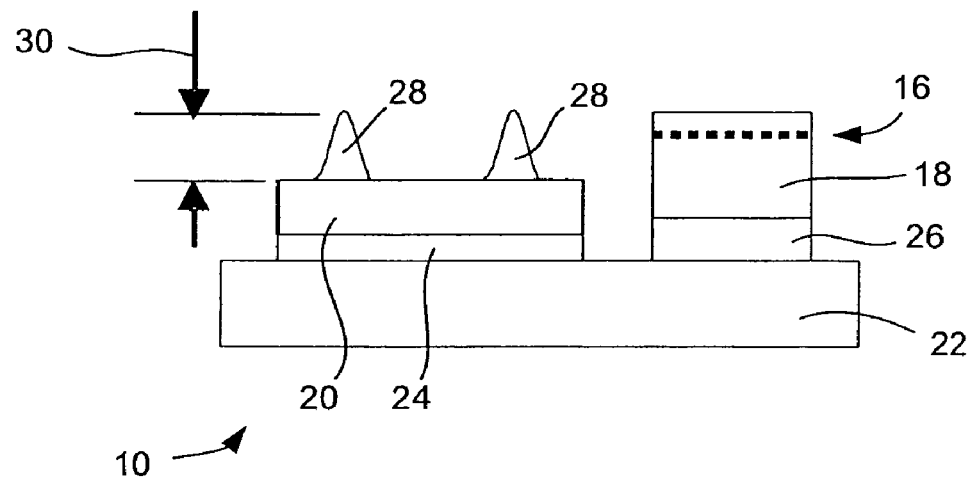
FIG. 1 is a diagrammatic cross section of a hybrid assembly or portion thereof according to one aspect of the present invention.

FIG. 1 shows a hybrid assembly 10 wherein optical waveguides 12 on a planar waveguide substrate 14 (both shown in FIG. 2) must be aligned to waveguides 16 on an SOA (Semiconductor Optical Amplifier) array substrate 18. (The waveguides 12 and waveguides 16 are shown in a cross section in which only a single representative waveguide 12 is visible, with multiple waveguides positioned below and above the plane of the Figures.) A dark glass substrate 20 is mounted on a lower alignment substrate 22 using an organic adhesive or solder 24. The SOA array substrate 18 is also mounted on the alignment substrate 22 by any acceptable method such as a solder layer 26. The dark glass substrate 20 provides oversized glass bumps 28 that will later serve as alignment standoffs. The bumps are termed "oversized" because they have a height or standoff distance 30 from the dark glass substrate 20 which is greater than necessary to be to properly align waveguides 12 on the planar waveguide substrate 14 to the SOA array waveguides 16.

The oversized dark glass bumps 28 desirably can be created in situ (on the substrate 20 during the assembly and alignment process of the hybrid assembly 10) using laser bump formation. The bumps can also be pre-fabricated on the dark glass substrate 20 prior to attachment of the substrate 20 to the alignment substrate 22. Height tolerance for the oversized bumps may be relatively relaxed (for example, as great as 5-30 μm), since subsequent alignment steps will accomplish fine height alignment (for example, to tolerances of 0.1-0.3 μm). The relaxed bump height requirement enables a wide array of low-cost bump pre-fabrication processes, including but not limited to laser bump formation, molding, embossing, surface machining or frit screen printing. For example, oversized glass bumps 28 for use in the context of the present invention may be formed by hot embossing a thin sheet of glass to form a series of closely-spaced raised domes.

Figure 2:
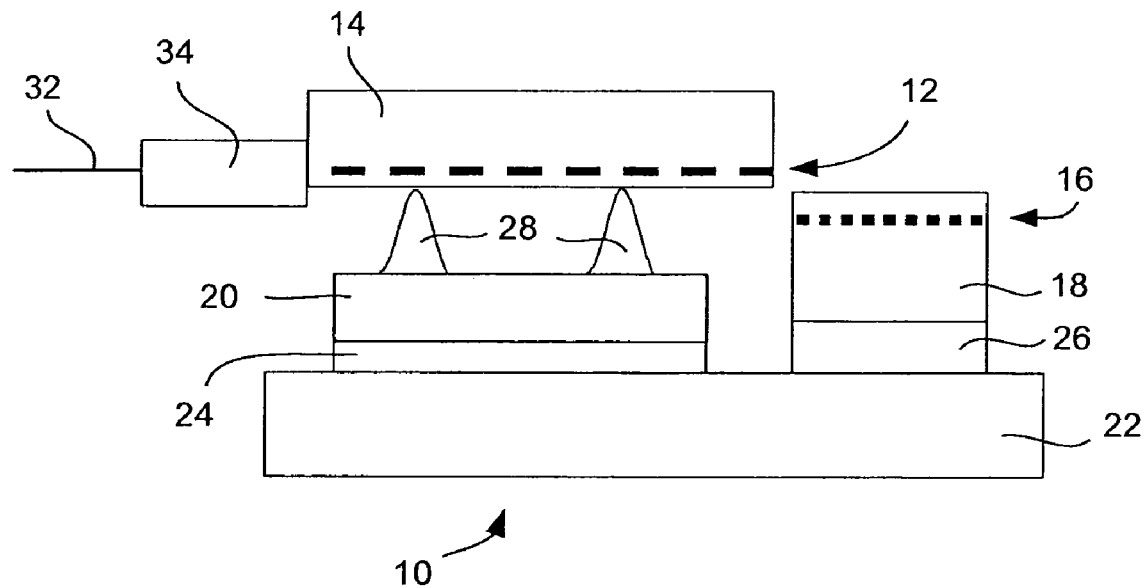
FIG. 2 is a diagrammatic cross section of the hybrid assembly of FIG. 1 with a planar waveguide substrate 14 positioned thereon for alignment to another substrate in the form of an SOA 18.

A planar waveguide substrate, such as planar waveguide substrate 14 connected to an optical fiber 32 by a pigtail block 34, is then positioned on top of the oversized glass bumps 28 as shown in FIG. 2. Using top-side visible or IR imaging, the planar waveguide substrate waveguides 12 are roughly aligned to the SOA array waveguides 16. Due to the oversized glass bumps, the planar waveguide substrate waveguides are displaced vertically from the SOA array waveguides by a relatively small distance, for example, 5-30 μm.

Figure 3:
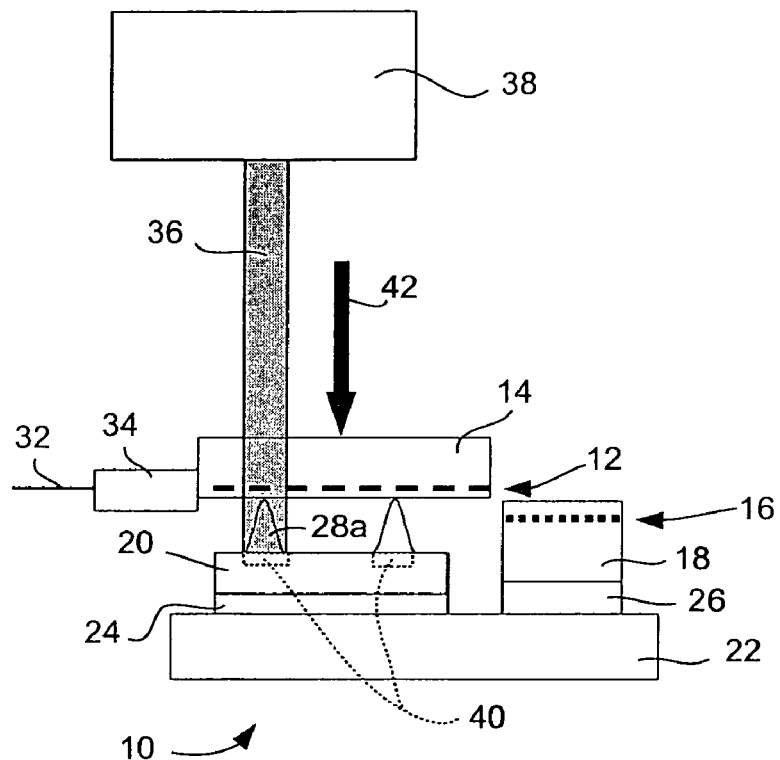
FIG. 3 is a diagrammatic cross section of the hybrid assembly of FIG. 2 showing irradiation by an irradiation beam 36 from a source 38.

A radiation beam 36, such as an IR radiation beam from a suitable source 38, such as a 1550 nm laser, is then directed through the planar waveguide substrate 14 and onto an oversized dark glass bump, such as bump 28a, as shown in FIG. 3. Long wavelength IR light (e.g. $\lambda=1.55$ μm) will pass through a Si planar waveguide substrate with relatively little attenuation, for example. This same light, however, is strongly absorbed as it passed through the dark glass substrate 20, leading to dark glass bump heating in FIG. 3. If the planar waveguide substrate 14 is fabricated in silica instead of Si, a shorter wavelength source (e.g., $\lambda=850$ nm) may be used.

FIG. 3 shows the radiation beam 36 passing through the planar waveguide substrate 14 from the top, but in an alternative configuration of dark glass bump heating could be accomplished using IR radiation from below. This approach would require the lower alignment substrate 22 to be fabricated in a material that is transparent to IR radiation (e.g., Si or silica). In another optional approach, optional heater electrodes 40 directly on or near the dark glass bumps may provide IR radiation for bump heating. These heater electrodes 40 could also be positioned on neighboring substrates in close proximity to the dark glass bumps, such as the planar waveguide substrate 14 or the alignment substrate 22.

Figure 4:
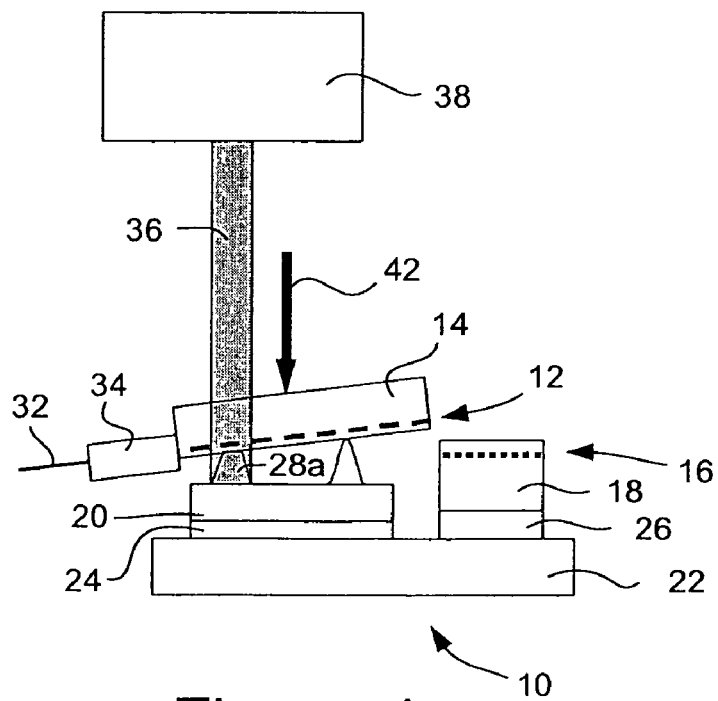

During the dark glass heating process, downward pressure is applied to the top surface of the planar waveguide substrate 14, as indicated generally by the solid arrow 42. If the oversized dark glass bump 28a is heated sufficiently, the downward pressure 42 will gradually reduce the height of the dark glass bump 28a and cause the glass of the bump 28a (the "bump glass") to be displaced laterally, as shown in FIG. 4. The rate of bump height reduction can be controlled by adjusting the pressure applied to the planar waveguide substrate 14 and/or the beam power of the radiation beam 36 applied to the dark glass bump 28.

Figure 5:
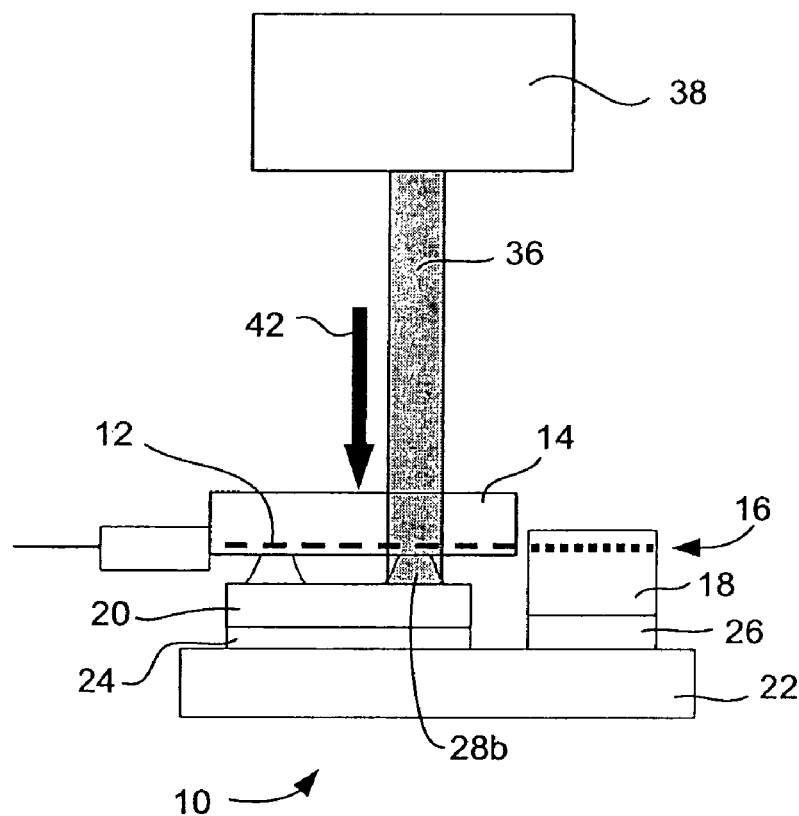
FIG. 5 is a diagrammatic cross section of the hybrid assembly of FIG. 4 showing softening and resulting reduction in height of bump 28b.
Figure 6:
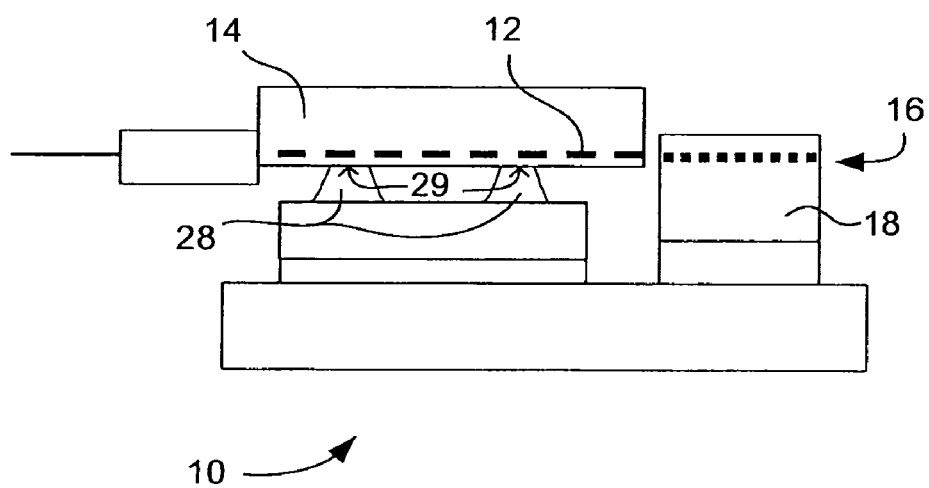
FIG. 6 is a diagrammatic cross section of the hybrid assembly of FIG. 5 after completion of alignment of waveguides 16 with waveguides 12, showing the relatively large contact area 29 between bumps 28 and substrate 14.

The dark glass bump heating process is repeated for the remaining oversized bump(s) 28b, as shown in FIG. 5. By gradually reducing the height of the oversized bumps 28 (for example, by multiple heating cycles on multiple bumps 28) the planar waveguide substrate waveguides 12 can be aligned to the SOA array substrate waveguides 16, as shown in FIG. 6.

This dark glass bump-based substrate alignment process may be significantly advantaged over other dark glass alignment approaches because a mechanical contact area 29 at the top of the dark glass bump 28, between the glass bump 28 and the plan waveguide substrate 14, can be made relatively large. This larger contact area 29 provides increased bump strength and resistance to deformation during alignment and adhesive under-fill cure processes. This larger contact area may be particularly important if microcracking or other structural defects significantly weaken other laser-formed dark glass bumps. Using pre-fabricated dark glass bump forming processes such as embossing, molding and so forth, arbitrarily shaped oversize bump shapes can be made, including shapes with larger substrate contact areas, if desired.

What is claimed is:

1. A method for fabricating glass bump standoff structures of precise height for substrate alignment, the method comprising:
    positioning a glass substrate on an alignment substrate;
    providing oversized glass bumps on the glass substrate by irradiating the glass substrate with a laser to form the oversized bumps;
    providing a heat source to heat the bumps;
    positioning a substrate to be aligned on the oversized bumps;
    reducing the height of the oversized bumps by a combination of manipulations comprising (1) softening the bumps by heating the bumps and (2) applying pressure to the substrate to be aligned; and
    supporting the substrate to be aligned on the glass bump standoff structures formed by the reducing step for alignment with another substrate,
    wherein the step of reducing the bump height includes laser irradiating the bumps through the alignment substrate.

2. The method according to claim 1 wherein the heat source is an irradiation beam in combination with the glass substrate being absorbing at a wavelength of the irradiation beam.

3. The method according to claim 2 wherein the irradiation beam is a 1.55 µm laser.

4. The method according to claim 1 wherein the substrate to be aligned comprises silicon.

5. The method according to claim 1 wherein the glass substrate comprises a dark glass.

6. The method according to claim 1 wherein the glass bumps comprise a dark glass.

7. The method according to claim 1 wherein the glass bumps are formed during the positioning of the substrate to be aligned.

* * * * *